Feb. 7, 1939.   J. E. McADAMS ET AL   2,145,942
POWER TRANSMISSION MECHANISM
Filed March 5, 1936    3 Sheets-Sheet 2

INVENTORS
Joseph E. McAdams
Warren D. Burton
By Parker, Carlson, Pfund & Hubbard
ATTORNEYS Feb. 7, 1939. J. E. McADAMS ET AL 2,145,942
POWER TRANSMISSION MECHANISM
Filed March 5, 1936  3 Sheets-Sheet 3
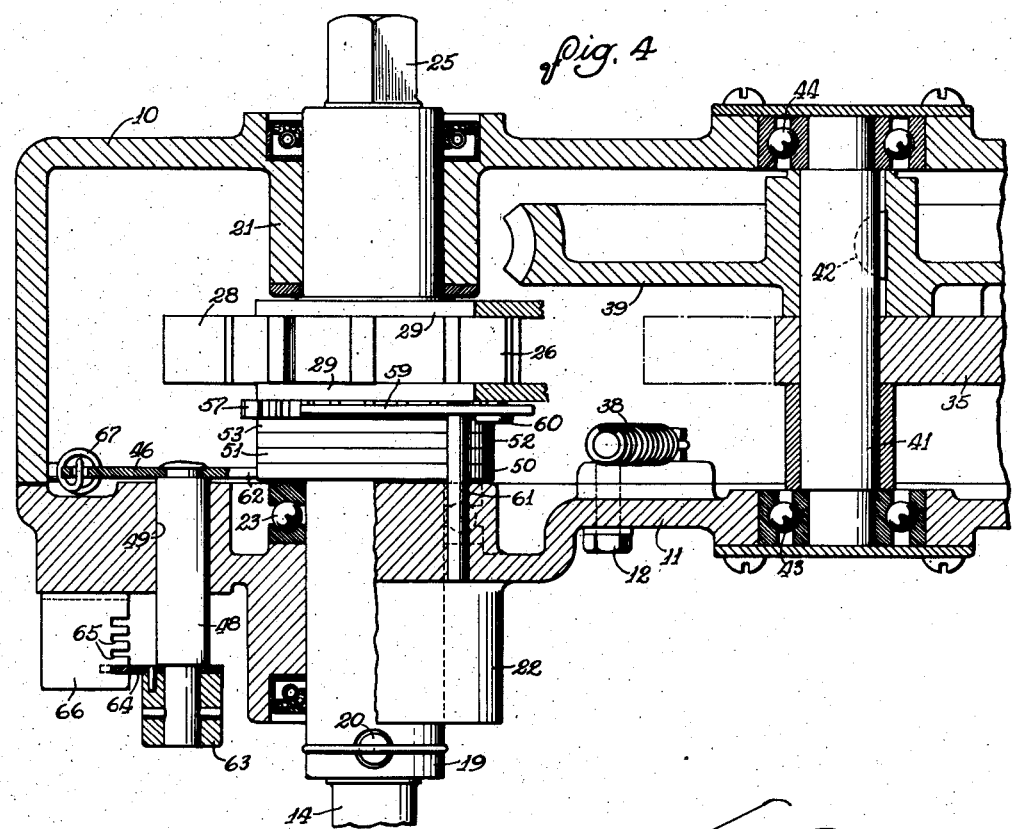
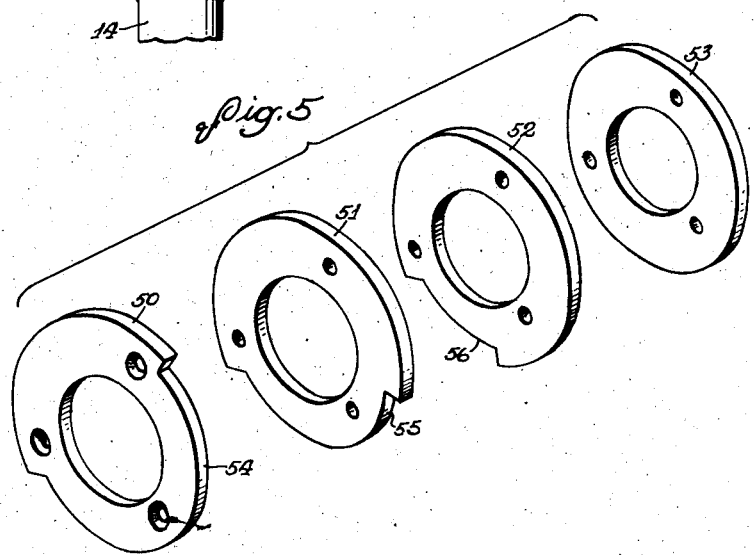
INVENTORS
Joseph E. McAdams
Warren D. Burton
By Parker, Carlson, Pitzner & Hubbard
ATTORNEYS Patented Feb. 7, 1939

2,145,942

UNITED STATES PATENT OFFICE 2,145,942

POWER TRANSMISSION MECHANISM

Joseph E. McAdams, Springfield, Ohio, and Warren D. Burton, Pasadena, Calif., assignors to The Steel Products Engineering Company, Springfield, Ohio, a corporation of Ohio Application March 5, 1936, Serial No. 67,244

6 Claims. (Cl. 74—125)

Our invention relates to improvements in power transmission mechanisms and is especially adapted for use in supplying power from electric driving motors, or other suitable sources of power, to stokers of the smaller type, such as are commonly used in domestic installations. Such stokers frequently include a screw conveyer through which coal or similar solid fuel is supplied to the combustion chamber of a furnace. It is desirable that the fuel be supplied to the combustion chamber in relatively small increments, since the fuel bed is thus maintained in a porous condition so that air penetrates the same more readily. A more intimate mixture of the air and fuel is thus brought about and consequently, better combustion characteristics are thereby obtained. It is thus desirable that the driven element for actuating the screw conveyer, or the like, should receive periodic impulses giving the same a progressive step by step movement.

It is an object of our invention to provide a power transmission mechanism of the type described which is adapted to periodically impart a series of driving impulses to a driven member adapted to be connected to the screw conveyer of a stoker or the like, and which includes an arrangement for selectively varying the number of such driving impulses in each periodic series thereof.

Another object of our invention is to provide an improved power transmission mechanism of the type described, which is rugged in construction, effective and quiet in operation, and which may be assembled as a compact unitary structure within a single enclosing casing.

Further objects and advantages of our invention will become apparent as the following description proceeds, and the features of novelty which characterize our invention are pointed out with particularity in the claims annexed to and forming a part of this specification.

For a better understanding of our invention, reference may be had to the accompanying drawings, in which, Figure 1 is a side elevation partly in section of a power transmission mechanism adapted for use with a domestic stoker and embodying our invention.

Fig. 4 is a sectional view along the line 4—4 of a portion of the mechanism shown in Fig. 1.

Fig. 5 is an exploded perspective view of a plurality of cams included in the mechanism shown in Figs. 1 to 4, inclusive.

Figure 1:
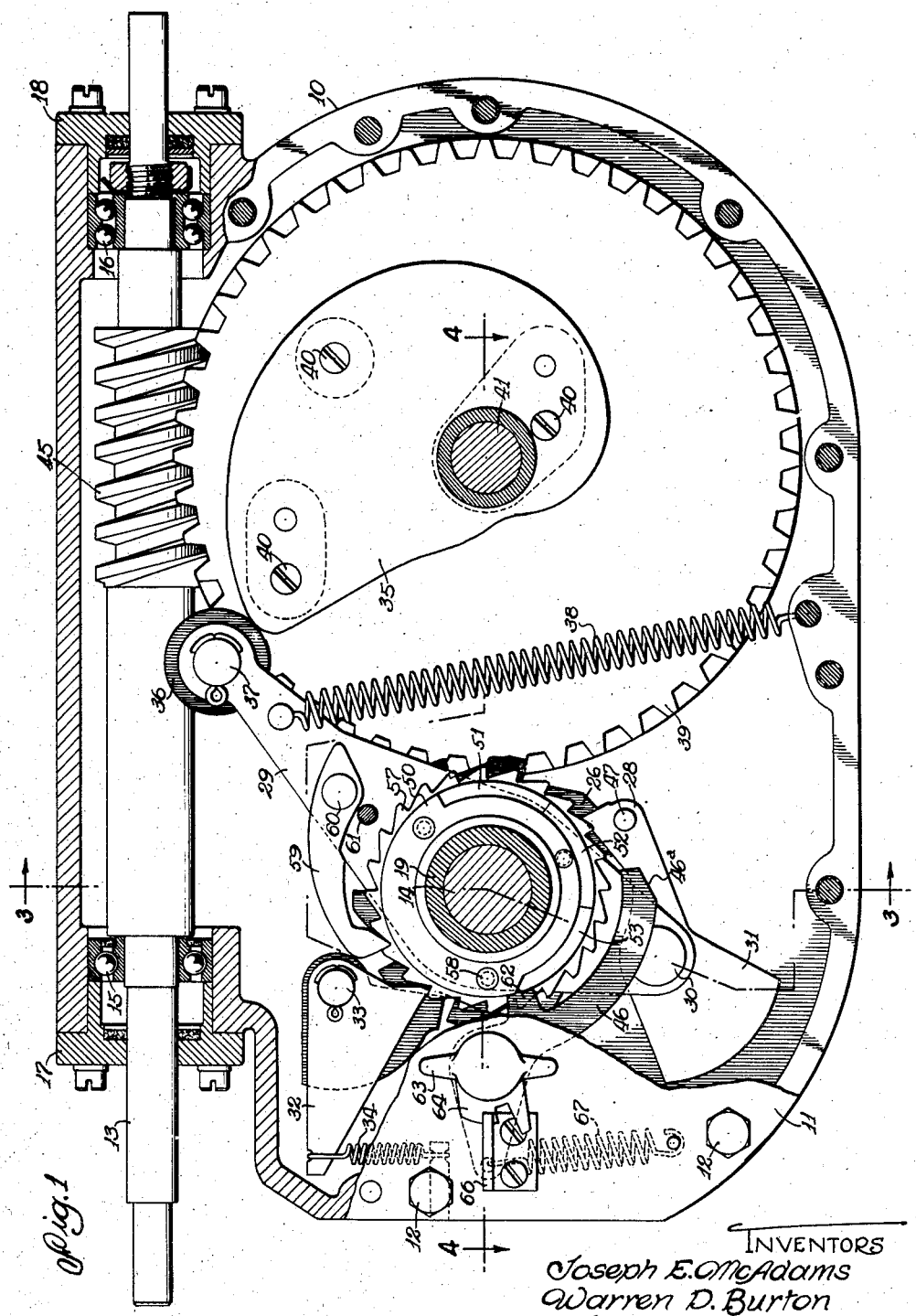

While our invention is susceptible of various modifications and alternative constructions, we have shown in the drawings and will herein describe in detail the preferred embodiment, but it is to be understood that we do not thereby intend to limit the invention to the specific form disclosed, but on the other hand intend to cover all modifications and alternative constructions falling within the spirit and scope of our invention.

Referring to the drawings, we have illustrated a power transmission mechanism, embodying our invention, which is mounted as a compact unitary structure within an enclosing casing 10. The casing is provided with a rear wall and integral side walls, the open end thereof being closed by a removable cover 11 which is secured thereto by a series of cap screws 12. Power is delivered to the power transmission mechanism by a driving element or drive shaft 13 extending therein and rotated by a suitable electric driving motor or the like connected thereto. A driven element or driven shaft 14 also extends within the casing 10 and may be connected to a screw conveyer of a stoker or similar mechanism to be driven thereby. The driving shaft 13 is journaled in ball bearings 15 and 16, the outer races of which are held in position in suitable bores formed in the casing 10 by bushing rings 17 and 18, respectively. The driven shaft 14 is surrounded by a longitudinally extending quill or sleeve 19. A frangible connection is provided between the sleeve 19 and driven shaft 14, this connection being preferably in the form of a shear pin 20 extending through registering holes formed in the sleeve 19 and driven shaft 14. If an excessive load is imposed on the driven shaft 14, the pin 20 will be broken, thus disconnecting the shaft 14 and sleeve 19 so that the parts of the power transmission mechanism will not be subjected to the excessive load.

The sleeve 19 is journaled in suitable sleeve bearings formed by bosses 21 and 22 formed on the rear wall of the casing 10 and cover 11 thereof, respectively. An antifriction type thrust bearing 23 is interposed between a shoulder 24 formed on the sleeve 19 and the inner wall of the casing cover 11. The outer end 25 of the driven shaft 14 is preferably squared in order that the shaft may be rotated by a suitable wrench in case it becomes necessary to operate the mechanism by hand.

The improved power transmission mechanism which we have provided is adapted to impart a series of driving impulses to the driven shaft 14 from the driving shaft 13. In this way, a screw conveyer, for example driven by the shaft 14, moves successive increments of coal to the combustion chamber of a furnace. The driving impulses are imparted to the driven shaft 14 by a suitable ratchet mechanism which includes a ratchet wheel 26 rigidly secured to the sleeve 19 by a key 27 which engages cooperating keyways formed in the ratchet wheel 26 and sleeve 19. The ratchet wheel 26 is actuated in a counter-clockwise direction, as viewed in Fig. 1, by a cooperating pawl 28 which is pivotally supported on the lower portion of a bifurcated oscillatable lever 29 by a pivot pin 30. The pawl 28 is provided with a downwardly extending weighted portion 31 which tends to maintain the same in operative engagement with the ratchet wheel 26. A holding pawl 32, pivotally mounted on a pin 33, is biased to a position of engagement with the ratchet wheel 26 by a tension spring 34 in order to prevent clockwise movement of the ratchet wheel 26 as viewed in Fig. 1.

The side members of the bifurcated lever 29 are arranged on opposite sides of the ratchet wheel 26 and are loosely journaled on the sleeve 19. The lever 29 is oscillated about the axis of the sleeve 19 and driven shaft 14 by a cam 35 which engages a roller 36 rotatably mounted on the upper end portion of the lever 29 by a pin 37. The roller 36 is maintained in engagement with the peripheral surface of the cam 35 by a tension spring 38 secured at its opposite ends to the casing 10 and the lever 29. The cam 35 is rotated by a gear wheel 39 to which it is rigidly secured by a series of screws 40. The cam 35 and gear wheel 39 are mounted on a jack shaft 41, the gear 39 being keyed thereto by a key 42 which engages cooperating keyways formed in the shaft 41 and gear 39. The shaft 41 is journaled in ball bearings 43 and 44, the outer races of which are mounted in oppositely positioned bores formed in the rear wall of the casing 10 and cover 11 thereof, respectively. The gear 39 is connected to the driving shaft 13 by a worm 45.

It will thus be seen that upon rotation of the driving shaft 13, the gear 39 and cam 35 secured thereto will be continuously rotated by the worm 45. Upon such rotation of the cam 35, the roller 36 mounted on the upper end of the lever 29 follows the surface of the cam 35 due to the bias of the spring 38 and the lever 29 is thus continuously oscillated about the axis of the driven shaft 14 through an arc of substantially constant amplitude. Upon each such oscillation of the lever 29, the pawl 28 is actuated into engagement with successive teeth on the ratchet wheel 26 so that the latter is rotated in progressive steps. As a consequence, driving impulses or increments of rotative movement are imparted to the driven shaft 14. The teeth on the ratchet wheel 26 are preferably made relatively long so that only about ten teeth are required to cover its periphery. Thus, the screw conveyer to which the driven shaft 14 is connected is turned through one full revolution of movement by ten increments of rotative movement. Consequently, a small amount of fuel will be moved by the screw conveyer during each increment of movement thereof and the bed of burning fuel will thereby be maintained in a porous condition that promotes efficient combustion.

We have provided an improved arrangement for selectively varying the number of driving impulses imparted to the driven shaft 14 in a unit of time or cycle of operation so that the total quantity of fuel, for example, supplied by the stoker screw conveyer connected to the driven shaft 14, may be selectively varied. This arrangement includes a detent 46 having a beveled nose or cam portion 46a engageable with a pin 47 secured to the pawl 28 for lifting the pawl out of operative engagement with the ratchet wheel 26. The detent 46 is rigidly secured to a pin 48 rotatably and slidably mounted in a hole 49 formed in the casing 11, as best shown in Fig. 4.

Figure 2:
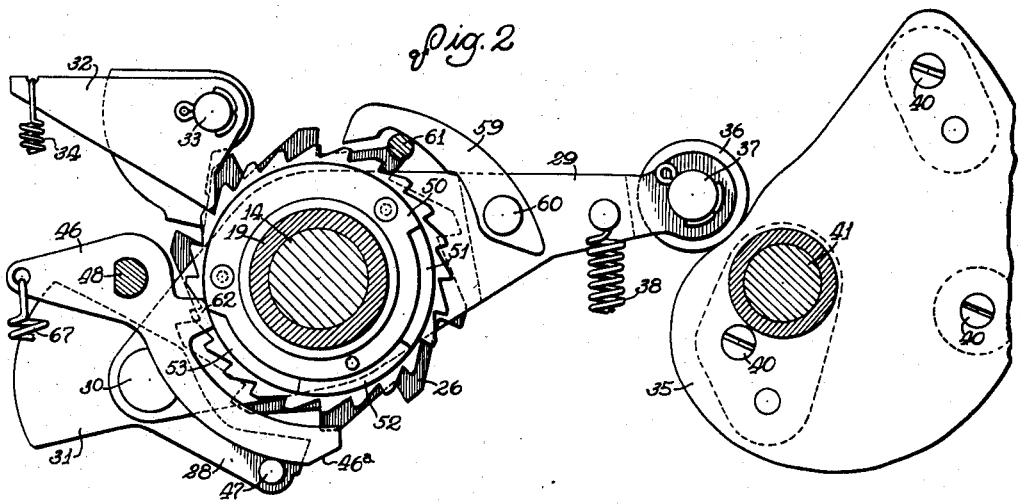
Fig. 2 is a detail view of a portion of the power transmission mechanism shown in Fig. 1 and particularly illustrates the relative positions of the parts thereof during the periodic disconnection of the driven element from the driving element.
Figure 3:
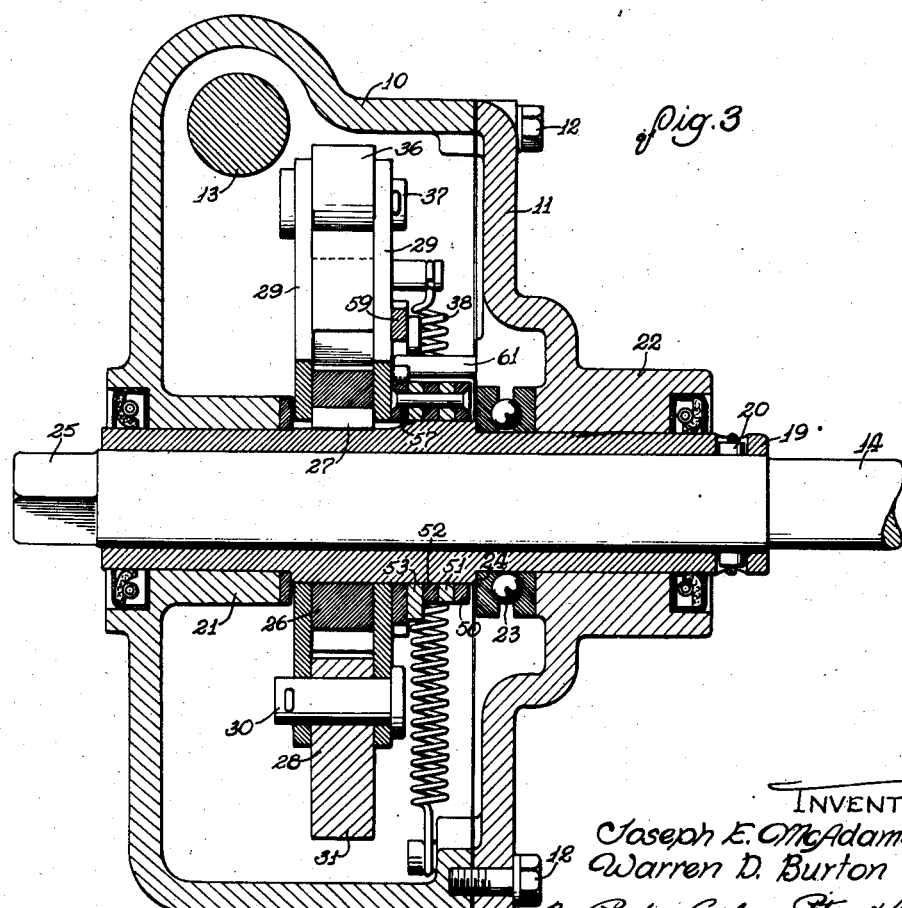
Fig. 3 is a sectional view along the line 3—3 of the mechanism shown in Fig. 1.

The detent 46 is in turn moved into and out of operative position for engagement with the pawl 28 by an interrupting arrangement including a plurality of rotatable cams 50, 51, 52 and 53 loosely journaled on the sleeve 19. I preferably provide a plurality of cams having cam surfaces of progressively different configuration in order that the detent 46 may be selectively moved into engagement with any one of the cams so as to vary the duration of the period during which the pawl 28 is maintained out of operative engagement with the ratchet wheel 26. As best shown in Fig. 5, the cams 50 to 53, inclusive, are disk shaped. The cam 53 has a cam surface which extends entirely about the same while the cams 50, 51 and 52 have notches or relieved portions 54, 55 and 56 formed thereon so that the peripheral cam surfaces thereof are progressively longer. The cams 50 to 53, inclusive, are rigidly secured together and also secured to a second ratchet wheel 57 by a series of rivets 58 extending through registering holes formed therein. Substantially continuous rotative motion is imparted to the ratchet wheel 57 by a cooperating pawl 59 pivotally secured to the oscillating lever 29 by pivot pin 60. When the lever 29 is oscillated to the extremity of its clockwise motion in the position shown in Fig. 2, a pin 61 mounted on the enclosing casing cover 11 engages the pawl 59 and lifts it out of engagement with the ratchet wheel 57 so that when the lever 29 again moves in a counterclockwise direction, the pawl 59 engages the next tooth on the ratchet wheel 57, moving the same in a counterclockwise direction as viewed in Fig. 1. The pin 61 thus prevents the pawl 59 from engaging any but the next successive tooth on the ratchet wheel 57 even though the pawl is oscillated a distance of two or more teeth by the lever 29, since the pin maintains the pawl out of contact with other than the next successive tooth. The ratchet wheel 57 is provided with a relatively large number of teeth and it will thus be seen that the ratchet wheel 57 and its attached cams 50 to 53, inclusive, are substantially continuously rotated during the rotation of the driving shaft 13.

The detent 46 is provided with a projection 62 which rides on the cam surfaces of one of the adjacent cams 50 to 53, inclusive. The pin 48, on which the detent 46 is mounted, is provided with a manual operating handle or knob 63, located exteriorly of the casing 10, which facilitates axial adjustment of the same so that the detent 46 may be selectively positioned in operative relation with any one of the cams 50 to 53, inclusive. A notched plate 64 extending from the side of the operating handle 63 is selectively engageable with cooperating notches 65 formed in a plate 66 so that the detent 46 may be maintained in alinement with the selected one of the cams. A tension spring 67 secured to the detent 46 and to the cover 11 of the enclosing casing biases the detent 46 to a position of engagement with the cams.

It will thus be seen that if the detent 46 is moved by the operating handle 63 to the position shown in Fig. 4, it will engage the cam 50. Then, as the cam 50 is rotated by the ratchet wheel 57 and pawl 59 the detent 46 will be moved outwardly during the portion of the revolution of the cam 50 in which the projection 62 is in contact with the raised cam surface of the cam 50. Then each time the pawl 28 moves from the position shown in Fig. 1 to that shown in Fig. 2 to engage the next tooth on the ratchet wheel 26, it is lifted out of engagement with the ratchet wheel 26 by the elevated end of the detent 46 engaging the pin 47. Subsequently, when the projection 62 on the detent 46 moves into the relieved or notched portion 54 of the cam 50, the detent 46 moves out of the path of the pin 47 on the pawl 28 so that the latter is again free to engage successive teeth in the ratchet wheel 26. The operation is substantially the same when the detent 46 is moved into engagement with the cams 51 and 52 except that the interval during which the main pawl 28 is permitted to engage successive teeth on its cooperating ratchet wheel 26 is shorter than in the case of the cam 50. Since the cam 53 has no notched or relieved portion therein, the pawl 28 is rendered entirely inoperative to move the ratchet wheel 26 when the detent 46 is moved into contact with the cam 53.

In the operation of the mechanism described above, the driving shaft 13 is rotated by a suitable electric motor, or other source of power. The detent 46 is moved into engagement with one of the cams 50 to 53, inclusive, by the manual operating handle 63, corresponding to the particular rate of fuel feed desired. The rotating drive shaft 13 rotates the cam 35 through gear 39 and worm 45. Rotation of the cam 35 oscillates the lever 29 which in turn actuates the main pawl 28 to impart a series of rotative impulses to the main ratchet wheel 26, connected to the driven shaft 14 by sleeve 19. The oscillation of the lever 29 also actuates pawl 59 which causes a rotation of its cooperating ratchet wheel 57 connected to the rotatable cams 50 to 53, inclusive. The movement of detent 46 into and out of position for engagement with pawl 28 is controlled by the particular cam which it contacts so that the number of rotative impulses imparted to the driven shaft 14 during each complete rotation of the substantially continuously rotating ratchet wheel 57 may be selectively varied.

It will thus be seen that we have provided a simple and effective arrangement by means of which the number of driving impulses imparted to the driven shaft 14 may be selectively varied. As a consequence, the amount of fuel fed by the stoker to the furnace may be readily controlled. At the same time, the screw conveyer, or the like, of the stoker is always actuated by a series of rotative impulses so that the fuel is always fed in increments to the furnace irrespective of the total rate of feed.

Although we have shown an embodiment of our invention which is particularly adapted for use in connection with a stoker designed for domestic use, we do not desire our invention to be limited to the particular construction shown and described and we intend in the appended claims to cover all modifications within the spirit and scope of our invention.

We claim as our invention:

1. A transmission mechanism comprising, in combination, a driving element, a driven element, a ratchet wheel having a driving connection with said driven element, a pawl engageable with said ratchet wheel, means including said driving element for actuating said pawl to move said ratchet wheel, interrupting means including a detent engageable with said pawl for moving said pawl out of operative engagement with said ratchet wheel, a plurality of rotatably mounted cams having cam surfaces of different configuration, cam follower means engageable with any selected one of said cams for actuating said interrupting means to periodically maintain said detent out of engagement with said pawl for predetermined sequential intervals of time, and means including said driving element for substantially continuously rotating said cams.

2. A transmission mechanism comprising, in combination, a driving element, a driven element, a ratchet wheel having a driving connection with said driven element, a pawl engageable with said ratchet wheel, means including said driving element for actuating said pawl to move said ratchet wheel, means for periodically maintaining said pawl out of engagement with said ratchet wheel for predetermined sequential intervals of time, said last named means including a plurality of rotatable cams having cam surfaces of different configuration and cam follower means engageable with any selected one of said cams for actuating said pawl out of engagement with said ratchet wheel, and means including said driving element for substantially continuously rotating said cams.

3. A transmission mechanism comprising, in combination, a driving element, a driven element, a ratchet wheel having a driving connection with said driven element, an oscillatable lever, means including said driving element for oscillating said lever, a pawl actuated by said lever and cooperating with said ratchet wheel to actuate the same, interrupting means including a detent engageable with said pawl for moving said pawl out of operative engagement with said ratchet wheel, a plurality of rotatably mounted cams having cam surfaces of different configuration, cam follower means engageable with any selected one of said cams for actuating said interrupting means to periodically maintain said detent out of engagement with said pawl for predetermined sequential intervals of time, a second ratchet wheel connected in driving relation with said cams, and means including a second pawl actuated by said lever and cooperating with said second ratchet wheel to actuate the same.

4. A unitary transmission mechanism comprising, in combination, an enclosing casing, a driving shaft and a driven shaft extending into said casing, a ratchet wheel mounted on said driven shaft and operatively connected thereto in driving relation, an oscillatable lever loosely journaled on said driven shaft, means including said driving shaft for oscillating said lever, a pawl actuated by said lever and cooperating with said ratchet wheel to actuate the same, interrupting means including a detent engageable with said pawl for moving said pawl out of operative engagement with said ratchet wheel, a plurality of disk shaped cams loosely journaled on said driven shaft and having relieved cam surfaces thereon of progressively varying length, means for selectively moving said detent into engagement with said cams, a second ratchet wheel loosely journaled on said driven shaft and connected to said cams in driving relation, and a second pawl actuated by said lever and engageable with said second ratchet wheel to actuate the same.

5. A unitary transmission mechanism comprising, in combination, an enclosing casing, a driving shaft and a driven shaft extending into said casing, a sleeve mounted on said driven shaft and rigidly connected thereto by a frangible connection, a ratchet wheel mounted on said sleeve and rigidly connected thereto, an oscillatable bifurcated lever loosely journaled on said sleeve and extending about said ratchet wheel, means including said driving shaft for oscillating said lever, a pawl pivotally mounted on said lever and cooperating with said ratchet wheel to actuate the same, a pivotally mounted detent engageable with said pawl to move the same out of operative engagement with said ratchet wheel, a plurality of disk shaped cams loosely journaled on said sleeve and having relieved cam surfaces thereon of progressively varying length, means including a manual operating handle located outside said enclosing casing for selectively moving said detent into engagement with said cams, a second ratchet wheel loosely journaled on said sleeve and rigidly connected to said cams, and a second pawl pivotally connected to said lever and engageable with said second ratchet wheel to actuate the same.

6. A transmission mechanism comprising, in combination, a driving element, a driven element, a ratchet wheel having a driving connection with said driven element, a pawl engageable with said ratchet wheel, means including said driving element for continuously actuating said pawl through a constant amplitude of movement to move said ratchet wheel, means including a plurality of rotatably mounted cams having cam surfaces of different configuration adapted to cooperate individually with said pawl for periodically maintaining the same out of engagement with said ratchet wheel during a selected number of a predetermined series of actuations of said pawl, adjustment means for rendering any selected one of said cams operative to control the engagement of said pawl with said ratchet wheel, a second ratchet wheel connected in driving relation with said cams, and means including a second pawl actuated by said driving member and cooperating with said second ratchet wheel to actuate the same.

JOSEPH E. McADAMS.
WARREN D. BURTON.

CERTIFICATE OF CORRECTION.

Patent No. 2,145,942. February 7, 1939.

JOSEPH E. McADAMS, ET AL.

It is hereby certified that error appears in the printed specification of the above numbered patent requiring correction as follows: Page 3, second column, line 30, claim 2, before the word "cam" insert including; and that the said Letters Patent should be read with this correction therein that the same may conform to the record of the case in the Patent Office.

Signed and sealed this 28th day of March, A. D. 1939.

Henry Van Arsdale.

(Seal) Acting Commissioner of Patents.